March 21, 1967 L. A. MEDLAR 3,310,739
D.C. DUAL RANGE METER USING RANGE DETERMINING
OPPOSITELY POLED DIODES
Filed April 5, 1963

| 12 VOLT | 6 VOLT |
|---|---|
| CONTACT POSITIVE POST OF 12 VOLT BATTERY | CONTACT NEGATIVE POST OF 6 VOLT BATTERY |

INVENTOR
Lewis A. Medlar

BY Arnold & Roylance

ATTORNEYS

United States Patent Office 3,310,739
Patented Mar. 21, 1967

3,310,739
**D.C. DUAL RANGE METER USING RANGE DE-
TERMINING OPPOSITELY POLED DIODES**
Lewis A. Medlar, Lansdale, Pa., assignor to Fox Products
Company, Philadelphia, Pa., a corporation of Pennsylvania
Filed Apr. 5, 1963, Ser. No. 270,899
10 Claims. (Cl. 324—115)

This invention relates to direct current dual range electric meters and, more particularly, to such meters having two separate operating ranges.

It has long been known that a single ammeter could be connected with various shunts and series impedances to provide a substantial number of different current and voltage ranges. Where a single unit multirange meter is provided, a multiposition switch is generally utilized to selectively connect in the appropriate impedances. These multiposition switches, although indispensible in many multirange units, are a constant source of problems, particularly when the meter is contemplated for use with unskilled operators. In accordance with this invention, it has been found that dual range meters can be constructed to completely eliminate these multiposition switching devices.

Accordingly, it is an object of this invention to provide a new and improved inexpensive and rugged direct current dual range electric meter without any mechanical switching devices.

It is another object to provide a dual range meter particularly suitable for measuring the terminal voltages of 6- and 12-volt automotive batteries.

Although the various embodiments of the invention are described in detail as dual range meters particularly adapted for use with automotive batteries, it should be understood that the invention is by no means limited to any particular use or structure. The invention is applicable in any situation where a dual range meter is desirable for measuring a particular direct current parameter such as current or voltage.

The dual range meter in accordance with this invention includes a pair of leads and a suitable measuring instrument. Two separate circuits, each including the measuring instrument and at least one diode or like device, are connected between the leads. The diode, or diodes, in one of these circuits is poled in a direction to permit current flow between the leads in a particular direction and in a particular path having the appropriate impedance for causing the meter to operate on one of its ranges. The diode, or diodes, in the other circuit is poled in the opposite direction so that when the leads are reversed, current can flow between the leads in the opposite direction through a different path including the appropriate impedance for causing the meter to operate on the other of its ranges.

The manner in which the foregoing and other objects are attained in accordance with this invention can more clearly be understood by referring to the following specification and drawings, the drawings forming a portion of the specification and wherein.

Figure 1:
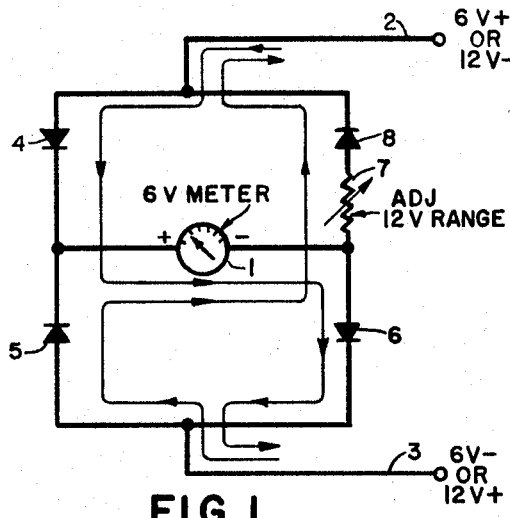
FIGS. 1–3 are electrical schematic diagrams illustrating three voltmeter embodiments of the invention.

As is illustrated in FIG. 1, the dual range meter in accordance with one embodiment of this invention includes a direct current voltmeter 1 and a pair of leads 2 and 3. The positive input terminal of meter 1 is connected to the cathodes of semiconductor diodes 4 and 5, the anodes of these diodes being connected, respectively, to leads 2 and 3. The negative terminal of meter 1 is connected to the anode of a semiconductor diode 6, the cathode of this diode being connected to lead 3. The negative terminal of meter 1 is also connected to lead 2 via a variable resistor 7 connected in series with a diode 8, the cathode of diode 8 being connected to lead 2.

Diodes 4 and 6 provide a first circuit between the leads so that if the potential between the leads is positive at lead 2 with respect to lead 3, current flows from lead 2 through diode 4, meter 1 from the positive terminal to the negative terminal, and diode 6, to lead 3. Diodes 5 and 8 and resistor 7 provide a second circuit between the leads so that if the potential is positive at lead 3 with respect to lead 2, current flows from lead 3 through diode 5, meter 1 from the positive terminal to the negative terminal, resistor 7, and diode 8, to lead 2. Thus, in one case the meter is effectively connected directly between leads 2 and 3, whereas in the other case the meter is effectively connected in series with resistor 7 between the leads.

Meter 1 can be of any direct current type constructed to measure voltage as desired and having a range corresponding to the lower of the two ranges measured by the dual range instrument. Where meter 1 measures relatively small voltages, as indicated in FIG. 1, the forward threshold conducting voltages of the diodes must be taken into consideration. It is well known that a semiconductor diode will not conduct in the forward direction until a predetermined voltage is impressed across the diode, this predetermined voltage usually being on the order of 0.5 volt. Accordingly, since there are always two diodes in series with the meter regardless of lead connection, there is approximately one-volt meter suppression. In other words, if the unit is adapted to measure the terminal voltage of 6-volt automotive batteries, meter 1 would preferably be a 6-volt meter so that when considering the one-volt suppression provided by diodes 4 and 6, the meter would traverse a full-scale deflection between one and seven volts.

The value of resistance provided by the resistor 7 would depend largely on the internal impedance of meter 1. For example, if the other range of the unit is to be adapted for measuring the terminal voltage of 12-volt automotive batteries, resistor 7 should be adjusted so that, taking into consideration the one-volt suppression of diodes 5 and 8, the meter traverses a full range deflection between 1 and 13 volts. The meter scale plate should be provided with appropriate indicia for the two ranges between 1 and 7 volts and 1 and 13 volts. If greater suppression is desired, additional diodes can be placed in series with those already in the circuit or diodes with higher forward conducting threshold voltages can be used.

Figure 2:
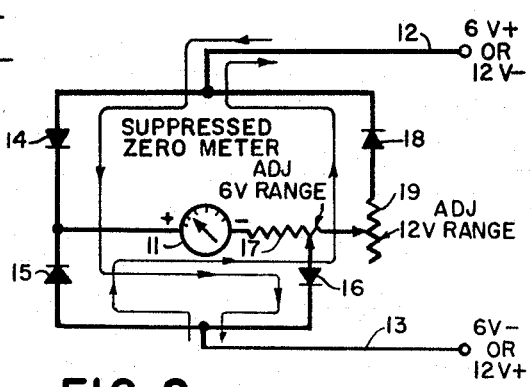

Another embodiment of the invention is illustrated schematically in FIG. 2 where a dual range meter unit is shown, including a voltmeter 11 of the suppressed zero type which can be of the type illustrated in detail in Patent Number 2,817,816 to Lewis A. Medlar, issued Dec. 24, 1957. The positive terminal of meter 11 is connected to the cathodes of semiconductor diodes 14 and 15, the anodes of these diodes being connected, respectively, to a pair of leads 12 and 13. A semiconductor diode 18 is connected in series with a variable resistor 19 and a resistor potentiometer 17, between the negative terminal of meter 11 and lead 12. A diode 16 is connected between the adjustable tap of potentiometer 17 and lead 13. The cathodes of diodes 18 and 16 are connected directly to leads 12 and 13, respectively.

If the potential appearing between the leads is positive at lead 12 with respect to lead 13, current flows in a first circuit from lead 12, through diode 14, meter 11 from the positive terminal to the negative terminal, a portion of potentiometer 17, and diode 16, to lead 13. If the leads are reversed so that the potential is positive at lead 13 with respect to lead 12, current flows in a second circuit from lead 13, through diode 15, meter 11 from the positive to the negative terminal, the entire potentiometer 17, resistor 19, and diode 18, to lead 12. Accordingly, in one case meter 11 is effectively connected in series with a portion of the resistance of potentiometer 17 between leads 12 and 13. In the other case, meter 11 is effectively connected in series with the entire resistance of potentiometer 17 plus the resistance of resistor 19 between leads 12 and 13.

If the dual range meter unit is to be adapted for measuring terminal voltages of 6- and 12-volt automotive batteries, potentiometer 17 is adjusted so that, taking into consideration the suppression provided by diodes 14 and 16 and the suppression provided by meter 11 itself, the meter provides a full-scale deflection in the range of 6 volts ±1 volt. Variable resistor 19 would be adjusted, taking into consideration the suppression provided by diodes 15 and 18, as well as the suppression provided by the meter 11, so that the meter indicates a full-scale deflection in the range 12 volts ±2 volts. The meter scale plate is provided with appropriate indicia corresponding to these voltage ranges. Thus, it should be noted that the use of the suppressed zero type meter provides greater sensitivity in a desired range.

Figure 3:
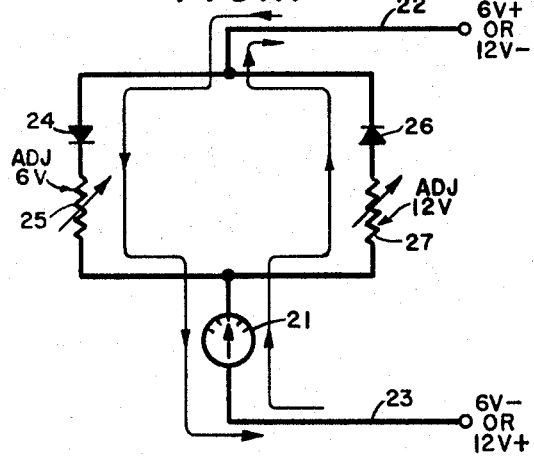

FIG. 3 schematically illustrates another embodiment of the invention wherein two diodes are utilized instead of four diodes as is required in the FIG. 1 and FIG. 2 embodiments. This circuit includes a meter 21 which can either be an alternating current type meter, i.e., a meter which provides the same indication regardless of polarity of the potential applied, or of a direct current type indicating zero volts at center scale and deflecting to either side depending upon the polarity of the applied signal. One terminal of meter 21 is connected directly to a lead 23. The other terminal of meter 21 is connected to the other lead 22 via a variable resistor 25 connected in series with a semiconductor diode 24, and is also connected to lead 22 via a parallel path including a variable resistor 27 connected in series with a diode 26. The anode of diode 24 and the cathode of diode 26 are connected directly to lead 22.

If the applied potential is positive at lead 22 with respect to lead 23, current flows through a first path including variable resistor 25, i.e., from lead 22 through diode 24, resistor 25, and meter 21 to lead 23. If the leads are reversed so that the potential is positive at lead 23 with respect to lead 22, current flows through a second path including variable resistor 27, current flow in this second path being from lead 23, through meter 21, variable resistor 27 and diode 26 to lead 22. Resistors 25 and 27 are adjusted to provide the desired meter deflection on the two desired ranges of the unit. The scale plate is provided with suitable indicia corresponding to the adjustments of resistors 25 and 27, taking into consideration the suppression provided by diodes 24 and 26.

Figure 4:
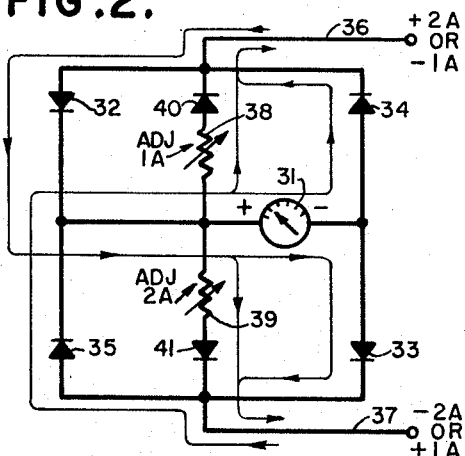
FIGS. 4 and 5 are electrical schematic diagrams illustrating two ammeter embodiments of the invention.

The principle of the invention can easily be extended to provide dual range ammeters as illustrated schematically in FIG. 4. This unit includes an ammeter 31 connected between a pair of leads 36 and 37 by means of a full wave diode bridge circuit including diodes 32–35. More specifically, the positive terminal of meter 31 is connected to the cathodes of semiconductor diodes 32 and 35, and the negative terminal of the meter is connected to the anodes of semiconductor diodes 33 and 34. The anode of diode 32 and the cathode of diode 34 are each connected to lead 36. The cathode of diode 33 and the anode of diode 35 are each connected to lead 37.

Resistors 38 and 39 are included to provide the required shunt impedances in order to obtain the two different operating ranges. Variable resistor 38 is connected in series with a diode 40, this series circuit in turn being connected in parallel with meter 31 and diode 34. Diodes 34 and 40 are poled to pass current in the same direction. Similarly, resistor 39 is connected in series with a semiconductor diode 41, and this series circuit is connected in parallel with meter 31 and diode 33. Diodes 33 and 41 are poled to pass current in the same direction. Ammeter 31 can be of any suitable direct current type capable, when connected in parallel with one of the shunt resistances, of measuring the current flow between leads 36 and 37. For purposes of illustration, the dual range ammeter shown in FIG. 4 is shown having 1 amp and 2 amp ranges. If leads 36 and 37 are connected to a source of current to be measured (not shown) so that lead 36 is positive with respect to lead 37, current flows from lead 36 through diode 32, meter 31, diode 33, to lead 37 and also flows through the parallel path including shunt resistor 39 and diode 41. Diodes 34, 35 and 40 are backbiased under these circumstances and therefore resistor 38 is not in the circuit. The indicating range of meter 31 is selected by appropriate adjustment of shunt resistor 39, this adjustment being by means of techniques well known in the design of ammeter circuits to provide full range deflection when a current of two amps flows through leads 36 and 37.

If lead 37 is positive with respect to lead 36, current flows through diode 35, meter 31, and diode 34, to lead 36, and also through the parallel path including resistor 38 and diode 40. Diodes 32, 33 and 41 are backbiased and therefore resistor 39 is not in the circuit. Thus, only resistor 38 provides the shunt impedance for ammeter 31 and by appropriate adjustment meter 31 will provide a full range deflection when one amp flows through leads 36 and 37.

Figure 5:
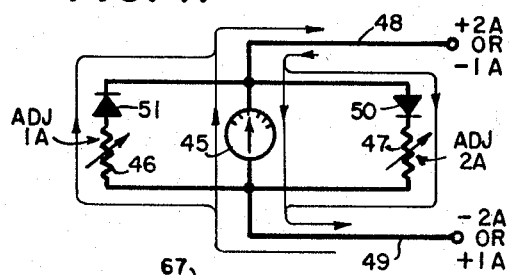

A simpler two diode dual range ammeter circuit is illustrated schematically in FIG. 5. The ammeter 45 required with this circuit is either of the A.C. type or of D.C. type which has a center scale indication and deflects to either side depending upon the direction of current flow through the ammeter. Ammeter 45 is selected so that when connected in parallel with one of the shunt impedances 46 and 47, the meter operates on the two desired current ranges.

Meter 45 is connected directly between leads 48 and 49. Shunt resistor 46 is connected in series with a diode 51 and this series circuit is connected in parallel with ammeter 45. In like fashion, resistor 47 is connected in series with a diode 50, this series circuit also being parallel with ammeter 45. Diodes 50 and 51 are polled to conduct current in opposite directions.

When lead 48 is positive with respect to lead 49, current flows through ammeter 45 and through the shunt resistance 47. Thus by appropriate adjustment of resistor 47 the ammeter will operate on a desired range, which, for example, may be a two-amp range. Diode 51 is backbiased under these circumstances, and therefore resistor 46 is not in the circuit.

If the leads are reversed so that lead 49 is positive with respect to lead 48, current again flows through ammeter 45. However, resistor 46 becomes the shunt impedance and by appropriate adjustment of resistor 46 the ammeter will operate on a desired range such as one amp. Diode 50 is backbiased, however, and therefore shunt resistance 47 is effectively disconnected from the circuit.

It should be noted that if meter 31 in FIG. 4 and meter 45 in FIG. 5 are selected so that the meter indicates in accordance with the lower of the ranges without any shunt impedance, the circuits can be simplified. In FIG. 4, for example, assuming the one- and two-amp ranges, if meter 31 is selected having a one-amp full range deflection, then shunt resistor 38 and diode 41 can be eliminated. Similarly, if meter 45 is selected having a one-amp range, resistor 46 and diode 51 can be eliminated in the FIG. 5 embodiment.

Figure 6:
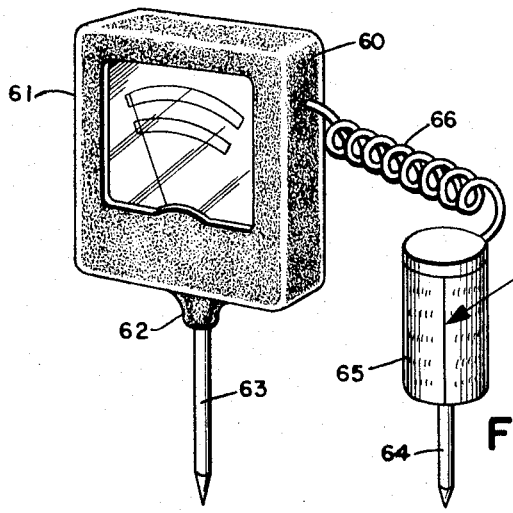
FIG. 6 is a perspective view showing a suitable casing for housing the electrical components.

A suitable casing construction for enclosing the components of the dual range meter circuits shown in FIGS. 1–5 is illustrated in FIG. 6. Preferably, the meter unit is housed in a soft rubber casing similar to that described in design patent Des. 168,481, issued to C. Shuler et al. on Dec. 23, 1952. The meter casing 60 presents a generally rectangular front surface (as viewed in FIG. 6) and is of sufficient depth to permit the meter and the associated circuit components to be housed within. The various diodes and resistors are preferably mounted on a circuit board which is maintained in position within the housing by means of suitable internal grooves in the casing 60. The meter itself is similarily mounted so that the meter scale plate and pointer are readily visible through a suitable rectangular-shaped aperture in the front of the casing. A suitable transparent front plate is mounted in front of the meter scale plate and is also maintained in position by suitable grooves in the casing 60. A boss 62, integrally molded with the casing, extends from the lower surface of the casing and securely maintains a pointed metal prod 63 in position which prod extends downwardly from the casing. Prod 63 is electrically connected to one of the leads from the meter circuit.

A second pointed prod 64 is securely mounted extending downwardly (as viewed) from a rigid metal or plastic cylindrical member 65. Prod 64 is connected to the other lead of the meter circuit via a flexible conductor 66. Wrapped around the outside of cylindrical unit 65 is a suitable set of instructions 67 which indicate to the operator the proper connections of the unit, if the unit is used as a voltmeter to measure automotive batteries. Similar instructions could be devised if the unit is used as an ammeter of for other voltage measurements.

When the dual range meter unit is used to measure the terminal voltage of a battery, the operator would firmly grip casing 60 and press prod 63 into the appropriate terminal of the battery. Cylindrical unit 65 would be firmly gripped in the other hand and prod 64 would then be pushed into the other battery terminal post. Prods 63 and 64 would be connected to the appropriate positive or negative terminals in accordance with the instructions 67. Preferably both prods are sufficiently rigid to permit the prods to be pressed through the coatings which sometimes cover the terminal posts of a battery.

While only a limited number of embodiments of this invention have been illustrated in detail, it is easily recognized that there are a large number of other possible embodiments within the scope of the invention. It is also specifically pointed out that even though the invention has, in part, been described for measuring the terminal voltage of automobile storage batteries, the invention is by no means limited to this particular use. The scope of the invention is more particularly defined in the appended claims.

What is claimed is:

1. In a direct current dual range instrument, the combination of
   an electrical meter for measuring a particular electrical parameter;
   a pair of electrical leads;
   first circuit means for permitting current flow only in a particular direction between said leads and in a path including said meter and having a predetermined impedance causing said meter to operate on one range; and
   second circuit means for permitting current flow only in the opposite direction between said leads and in a path including said meter and having a different predetermined impedance value causing said meter to operate on a different range.

2. In a direct current dual range electrical indicating device, the combination of
   a current responsive electrical meter;
   at least a first and a second diode;
   first and second impedance means each having a different value;
   a pair of leads;
   first circuit means including said first diode being so connected that current flow in a first direction between said leads must pass through said meter and said first impedance; and
   second circuit means including said second diode so connected that current flow in the opposite direction between said leads must flow through said meter and said second impedance.

3. In a direct current dual range meter, the combination of
   a direct current meter;
   a pair of leads;
   a first pair of diodes connected to complete a path for current flow in one direction between said leads and through said meter so that said meter operates on one range;
   a second pair of diodes and an impedance device connected to complete a different path for current flow in the opposite direction between said leads and through said meter so that said meter operates on a second range.

4. In a direct current dual range voltmeter, the combination of
   a direct current voltmeter;
   a pair of leads;
   first and second impedance means of different values;
   a first pair of diodes for completing a series path for current flow in one direction between said leads through said meter and said first impedance means; and
   a second pair of diodes for completing a different series path for current flow in the opposite direction between said leads through said meter and said second impedance means;
   said first and second impedance means being operative to determine two separate operating ranges for said meter.

5. A dual range meter in accordance with claim 4 wherein said direct current voltmeter is of the suppressed zero type.

6. A dual range meter in accordance with claim 4 wherein
   said first impedance means includes the resistance between one end and an adjustable tap of a potentiometer, and
   said second impedance means includes the entire resistance of said potentiometer in series with a variable resistor.

7. In a direct current dual range meter, the combination of
   a current responsive voltmeter;
   a pair of leads;
   a first diode and a first impedance connected in series to complete a series path for current flow in one direction between said leads and through said meter;
   a second diode and a second impedance having a different value than said first impedance, said second diode and second impedance being connected in series to complete a series path for current flow in the opposite direction between said leads and through said meter.

8. In a meter having separate ranges for measuring the terminal voltages of automotive batteries of two different rated terminal voltages,
   a pair of test prods each adapted for connection to a different terminal post of a battery;
   a meter housing having one of said prods rigidly affixed thereto and extending outwardly therefrom; and
   a dual range meter circuit mounted within said meter housing and comprising
      a current responsive meter,
      first diode circuit means connected to complete a path for current flow in one direction between said prods and through said meter, second diode circuit means connected to complete a path for current flow in the opposite direction between said leads and through said meter, and at least one impedance device connected in one of said diode circuit means for causing said meter to operate on one of two different ranges depending upon the direction of current flow between the prods.

9. In a dual range ammeter, the combination of
a pair of leads;
a current responsive ammeter connected between said leads;
a first impedance;
first diode circuit means for connecting said first impedance as a shunt across said ammeter when current flows in one direction between said leads;
a second impedance having a different value than said first impedance; and
second diode circuit means for connecting said second impedance as a shunt across said ammeter when current flows in the opposite direction between said leads.

10. A dual range ammeter in accordance with claim 9 further including
a fullwave bridge diode circuit connected between said leads and said ammeter so that current flow is always in the same direction through said ammeter regardless of the current flow direction between said leads.

References Cited by the Examiner

UNITED STATES PATENTS

| 2,942,189 | 6/1960 | Shea | 324—149 X |
| 3,079,556 | 2/1963 | Connelly | 324—131 |

FOREIGN PATENTS

| 1,122,161 | 1/1962 | Germany. |

WALTER L. CARLSON, *Primary Examiner.*

RUDOLPH V. ROLINEC, *Examiner.*

J. J. MULROONEY, *Assistant Examiner.*